United States Patent

Miller et al.

[15] 3,636,422

[45] Jan. 18, 1972

[54] TRACTION MOTOR CONTROL SYSTEM

[72] Inventors: Lalan G. Miller; John M. Mills, both of Pittsburgh, Pa.

[73] Assignee: Westinghouse Electric Corporation, Pittsburgh, Pa.

[22] Filed: Sept. 18, 1970

[21] Appl. No.: 73,645

Related U.S. Application Data

[63] Continuation of Ser. No. 817,664, Apr. 21, 1969, abandoned.

[52] U.S. Cl. ............................ 318/95, 318/269, 318/345
[51] Int. Cl. ................................................. H02p 7/68
[58] Field of Search ............... 307/136; 318/60, 87, 95, 269, 318/270, 345

[56] References Cited

UNITED STATES PATENTS

| | | | |
|---|---|---|---|
| 2,806,194 | 9/1957 | Lewis | 318/95 |
| 3,372,288 | 3/1968 | Wigington | 307/136 X |
| 3,389,318 | 6/1968 | Hoyt, Jr. | 318/345 |
| 3,559,009 | 1/1971 | Mills | 318/95 |

*Primary Examiner*—Bernard A. Gilheany
*Assistant Examiner*—W. F. Duncanson, Jr.
*Attorney*—F. H. Henson, R. G. Brodahl and C. J. Paznokas

[57] ABSTRACT

There is disclosed a control system for vehicle traction motors. The system includes an ON and OFF chopper-type current controller and switching systems for connecting the motors and the current controller in either traction (motoring) configuration or braking (generating) configuration and for suppressing the ON mode of the current controller just prior to changing over from one configuration to the other and reactivating the ON mode of the controller after the switch from one to the other configuration is completed.

13 Claims, 1 Drawing Figure

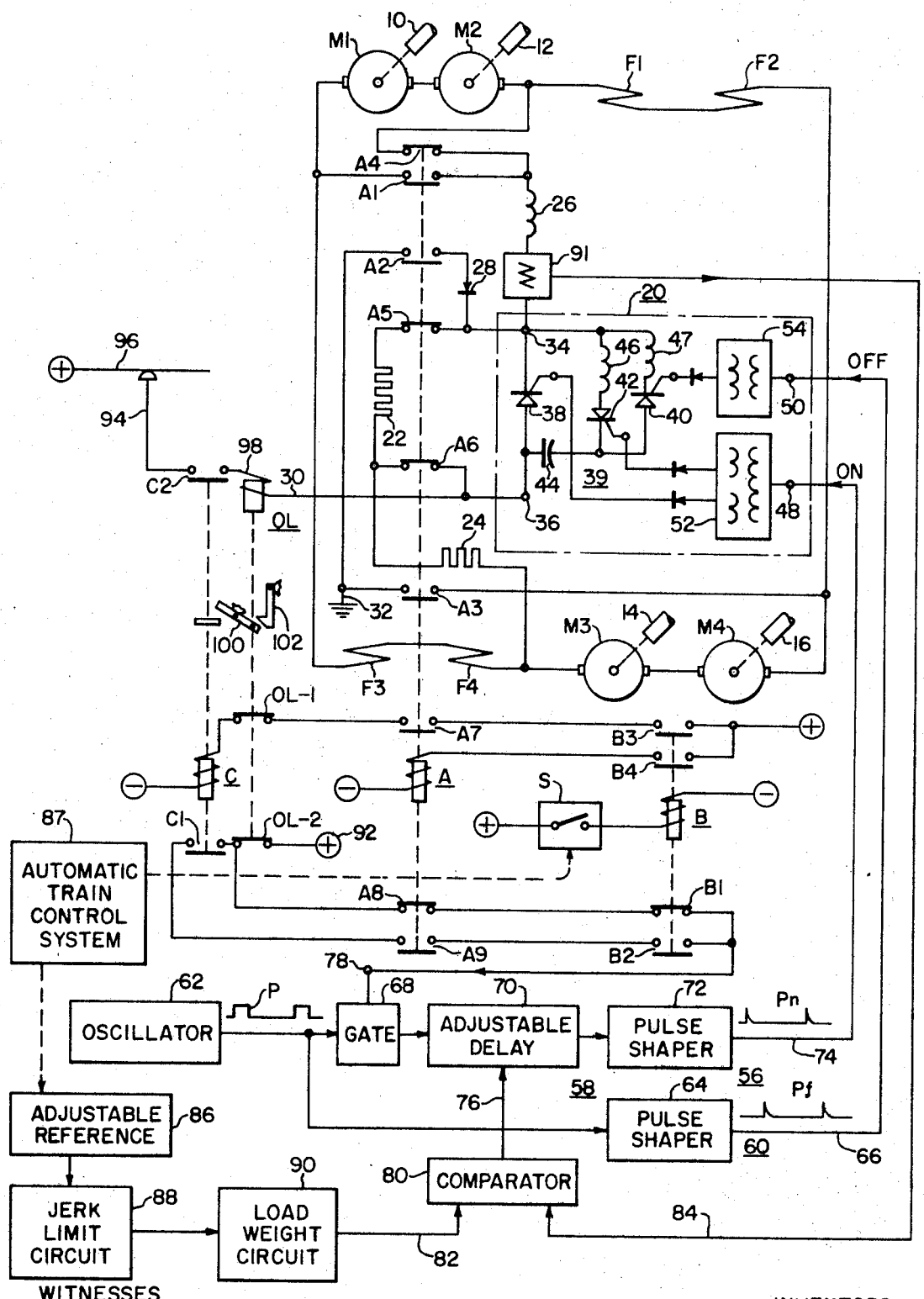

TRACTION MOTOR CONTROL SYSTEM

CROSS-REFERENCE TO RELATED APPLICATION

This application is a continuation of Ser. No. 817,664, filed Apr. 21, 1969, now abandoned.

BACKGROUND OF THE INVENTION

The voltages and currents in DC chopper-controlled main motoring or dynamic braking circuits of traction motors are such that sparking and arcing can occur at switch contacts directly involved in changing from motoring to braking and vice versa. Such deteriorating influences can occur just before making contact and upon breaking contact.

SUMMARY OF THE INVENTION

In order to fully utilize the advantages of DC chopper-controlled traction motors, the present invention is directed to a unique switching arrangement which assures (1) that the chopper (and thus the load current) is turned off before the motor system switches from motoring to braking or braking to motoring, and (2) that all main power circuits are properly set up for motoring or braking before the chopper is turned on.

In accordance with one embodiment of the invention, ON signals which turn on the chopper are suppressed and reinstated at appropriate times related to switching command and switching action by closing and opening a gate in a circuit which provides the ON signals for the chopper.

Other and further objects and advantages of the invention will become apparent from the following detailed description taken in connection with the single FIGURE drawing which is a diagram illustrating a preferred embodiment of the invention in connection with a vehicle traction motor system.

DESCRIPTION OF THE PREFERRED EMBODIMENT

In the drawing, M1, M2, M3, and M4 designate DC motors having field windings F1, F2, F3 and F4 respectively. The armatures of the motors are shown coupled to driving axles 10, 12, 14 and 16 of a vehicle, for example, a rapid transit car. A chopper-type ON-OFF current controller is shown at 20, and dynamic braking resistors are indicated at 22 and 24. Item 26 is a reactor.

The above-described components are selectively connectable in either motoring mode or breaking mode by switching operations effected by contact sets A1, A2, A3, A4, A5 and A6 of a relay A. This relay is also provided with sets of contacts A7 and A8, for later described uses. The relay A is shown unenergized in which contacts A1, A2, A3, A7 and A9 are open, while contacts A4, A5, A6 and A8 are closed.

With contacts A4, A5 and A6 closed as shown, the motor circuit is connected in dynamic braking configuration, that is the motor circuit is set up for braking. The braking circuit thus set up consists of two looped circuits each containing the armatures of two of the motors and the field windings of the other two motors with a common branch made up of the relatively large resistor 22 and the relatively smaller resistors 24. In braking, the motors are driven as generators by the vehicle and current circulates in each of the looped circuits and through the braking resistor, the braking effort being determined by the motor current and the braking energy being dissipated in the resistor.

The chopper 20 is connected across resistor 22 so that when the chopper is turned on, resistor 22 is shunted or bypassed, and when the chopper is turned off, resistor 22 is reinserted in the circuit. The average braking current, and consequently the braking effort, is controlled by time ratio control of the ON-OFF times (periods) of the chopper, that is by controlling the difference between the length of the OFF periods and the length of the ON periods of the chopper.

When relay A is energized contacts A4, A5 and A6 open to open the braking circuit, and contacts A1, A2 and A3 close to connect the motor circuit components in the motoring configuration, that is to set up the circuit for traction. In the motoring configuration, motors M1 and M2 are connected in series with their fields F1 and F2, and motors M3 and M4 are connected in series with their fields F3 and F4. The two pairs of series-connected motors are connected in parallel. The chopper 20 is connected in series with the motor network between a power input line 30 and another power input line 32 or ground. The specific location of the chopper 20 in the circuit is between the input line 30 and the motor system. Thus, the chopper 20 is effectively in series with the line 30 and in position to control power applied to the motor system through the line 30 when the latter is connected to a power supply source. In the motoring configuration, reactor 26 is connected in series between the chopper 20 and the motors to smooth the motor current. Through contacts A2, diode 28 is connected across the motors and reactor 26 to provide the well-known freewheeling function.

Basically, a chopper is a switch which is operated off and on (opened and closed) rapidly. Utilizing a chopper as a control element, a circuit may be controlled by controlling the ration of ON time to OFF time of the chopper. Thus, the average current in a line may be controlled by inserting a chopper in series in the line and controlling the ratio between the lengths of successive ON and OFF periods of the chopper.

The particular chopper 20 shown by way of example, is provided with main terminals 34 and 36, and further includes a thyristor 38 for carrying main load current between terminals 34 and 36 when turned ON. A commutating circuit 39 is connected across the cathode-anode path of thyristor 38 for commutating or turning off thyristor 38 in response to an OFF signal supplied to the chopper. The commutating circuit 39 includes thyristors 40 and 42, a capacitor 44 and a reactor 46 interconnected as shown. A protective reactor 47 is inserted in series with the cathode of thyristor 40 for the protection of that thyristor. The chopper is provided with respective ON and OFF input lines 48 and 50, respectively, line 48 being connected to the gate circuits of thyristors 38 and 42 through a pulse transformer 52, while line 50 is connected to the gate circuit of thyristor 40 through a pulse transformer 54. For isolation, the gates of thyristors 38 and 40 are fed from separate secondaries of transformer 52. It will be appreciated that the gate circuits of the thyristors are simplified so that protection networks and control connections to the thyristor cathodes are not shown. Likewise, single-line symbolic technique is use in illustrating the input and output lines of transformers 52 and 54, and the later described circuits for providing the control ON and OFF pulses to the chopper 20.

In considering the operation of the chopper 20 per se, assume that there is power in the circuit in which the main chopper terminals 34 and 36 are connected. To start the chopper, thyristor 40 is first turned on by a pulse supplied to its gate, thus charging capacitor 44 through thyristor 40 from the power applied to the main input terminals 34 and 36 of the chopper. When capacitor 44 becomes charged, the current through thyristor 40 goes to zero and that thyristor turns off. The chopper is then ready for operation and is turned on by simultaneously firing thyristors 38 and 42 in response to gate signals applied thereto. This does two things. It connects the power circuit of the motor (braking or motoring configuration) through thyristor 38. Simultaneously, it sets up an oscillatory circuit consisting of capacitor 44 and reactor 46. Current will flow from the capacitor through thyristor 38 into inductor 46 and then from the inductor back through thyristor 42 to the capacitor with voltage on the capacitor then reversed. Thyristor 42 turns off when the current through it goes to zero. Thyristor 38 will remain conducting (ON). The chopper is now in its ON or conductive condition with substantially full motor current (braking or motoring) flowing through thyristor 38.

To turn the chopper off, thyristor 40 is again turned on, thus applying the reverse charge of capacitor 44 as a back-bias across thyristor 38 thereby turning thyristor 38 off. This of course turns the chopper 20 off. The capacitor 44 will again charge through thyristor 40 from the motor circuit. By controlling the gate pulses applied to thyristors 38, 40 and 42, the chopper 20 can be turned on and off rapidly in successive intervals to effect a desired control of the power circuit (braking and motoring).

When the motor circuit is connected in motoring configuration (relay A energized), and power is applied to lines 30 and 32, the average motor current is controlled by controlling the ON-OFF time ratio of the chopper, that is by controlling the ratio of ON time to OFF time. It may be noted that when chopper 20 is ON, the diode 28 is in the blocking direction with respect to line voltage so that no current flows through it. However, when the chopper is OFF, the diode 28 provides a path for the inductive motor current, forming a loop circuit through the motors, the diode 28 and reactor 26 so that the motor current decays at a rate determined by the constants of the circuit.

In order to control the average motor current for either braking or motoring, time ratio control of the chopper may be effected in a number of ways. Time ratio control, that is the ratio of the length of the ON periods to the length of the OFF periods, my be effected by (a) providing constant frequency output pulses (ON periods while varying either the leading or the trailing edges of the ON pulses or both, or (b) varying the frequency of constant length ON periods, or, (c) varying the lengths of the ON and the OFF periods as needed. Method (a) is known as pulse width modulation, method (b) is known as variable-frequency control while method (c) which has some of the characteristics of both (a) and (b) is known as ripple control. It may be noted that ripple control of a similar chopper in connection with similar motor circuits is disclosed in U.S. Pat. application Ser. No. 711,109, filed Mar. 6, 1968, by John M. Mills entitled "Control System for Traction Motors," and assigned to the same assignee as the present application. Although the present invention may be practiced with any mode of time ratio control, the specific example disclosed herein is in connection with pulse width modulation by control of the leading edge of constant frequency output pulses (ON periods) of the chopper.

A control circuit 56 (shown in single-line diagram) generates control signals for providing pulse width modulation type of time ratio control of the chopper 20 in accordance with commands representing desired braking or motoring efforts. The control circuit 56 has two channels 58 and 60 supplied with constant frequency pulses P from a common pulse generator 62, for example a suitable square wave oscillator. The frequency or repetition rate of the oscillator pulses P may for example be 200 per second. Channel 60 includes a pulse shaper 64 and an output line 66 for supplying OFF pulses Pf to the OFF input line 50 of chopper 20. Channel 56 includes a gate 68, a phase controller 70, a pulse shaper 72 and an output line 74 along which ON pulses Pn are supplied to the ON input line 48 of the chopper 20. Although pulses Pn and Pf are of the same shape and frequency, their phase relations are adjustable by the phase shifter 70, which by way of example is shown as an adjustable delay that is controllable by signals applied through a control line 76.

As hereinbefore explained, the ON time (length of ON period) of the chopper 20 from the time an ON signal is received by the chopper on line 48 to the time an OFF signal is received on line 50. From this it is apparent that by changing the phase relations between the ON pulses Pn and the OFF pulses Pf, the ON times of the chopper and therefore the average current in the motor circuit in either motoring or braking mode may be controlled as desired.

Gate 68 is provided with a control input terminal 78, and is arranged to open and close in response to appropriate information supplied to the control input terminal 78; for example the the gate may be of any suitable type which will open in response to the presence of an appropriate control signal and close in the absence of such a signal. When open, gate 68 passes pulses from the oscillator 62 to the phase controller 70, and when closed, gate 68 suppresses or blocks the pulses, thereby preventing oscillator pulses P from reaching the phase adjuster 70.

The phase adjuster 70 is any suitable device which will control the phase of pulses Pn in channel 58 relative to the pulses Pf in channel 60 in response to suitable control signals applied to the control input line 76 of the phase shifter 70. By way of example, the phase shifter 70 is shown as a signal responsive adjustable delay, that will delay pulses passing therethrough in accordance with the value of a control input signal received on line 76. Line 76 is connected to the output of an error generator or comparator 80 which produces an output signal that is a function of the difference between the respective input signals applied to input lines 82 and 84 of the comparator 80. By way of example comparator 80 may be a summing device such as an operational amplifier for providing an output signal on line 76 that is proportional to the difference between the signals applied to the respective input lines 82 and 84. Signals representing desired (commanded) motor current for traction or braking are supplied to line 82 by an arrangement including an adjustable reference signal source 86 which may be part of an automatic system such as a train or vehicle control system 87, or it may be a manually adjustable source. The control signal supplied by the reference source 86 may be in the form of voltage or current, the magnitude of which represents the desired traction effort or the desired braking effort, to obtain the desired rate of acceleration or deceleration as the case may be. The speed and braking and the rates of acceleration or deceleration of the vehicle, therefore are controlled by adjusting the magnitude of the control signal supplied by the reference 86.

It will be understood that the control signal may change abruptly to change the rate of acceleration, or to change from acceleration to braking, and since the type of motor control system described herein is capable of following changes in the control signal almost instantaneously, it is desirable that the rate of change of the control signal be limited to an acceptable value for the safety and comfort of passengers in the vehicle. For this purpose the control signal supplied by the reference 86 may be modified by a jerk limit circuit 88. This circuit may be of any suitable type which is capable of limiting the rate of change of the control signal to an acceptable maximum and of providing an output signal representing the control signal as so modified. Although any suitable circuit of this type may be employed, a preferred circuit is shown in a copending application of L. G. Miller, Ser. No. 711,103, filed Mar. 6, 1968, entitled "Jerk Limit Circuit For Traction Motor Control Systems," and assigned to the assignee of the present patent application.

It will also be appreciated that the necessary tractive effort or braking effort for a desired rate of acceleration or deceleration varies with the weight of the vehicle, and it is therefore desirable to further modify the control signal so that the motor current actually maintained will be that required to produce the desired rate of acceleration or deceleration with the particular load or weight of the car at a particular time. The control signal from the reference source 86 may therefore be further modified by a load weight circuit 90 which measures the weight of the car and modified the control signal accordingly. Such circuits are known in the art, but a circuit particularly suitable for this type of control system is disclosed in another copending application of L. G. Miller, Ser. No. 711,002, filed Mar. 6, 1968, and entitled "Load Weight Circuit For Traction Motor Control Systems," and assigned to the assignee of the present application. Thus the reference signal from source 86, modified by the circuits 88 and 90, is applied to the input line 82 of the comparator as a control signal representing the motor current necessary to obtain the acceleration rate or deceleration rate called for by the command signal from the reference source 86. Actually, the signal on line 82 is a net command signal representing desired tractive or braking effort.

A signal whose value is proportional to actual motor current is applied to the comparator 80 for comparison with the signal on line 82 representing desired (commanded) motor current. The actual motor current signal is derived from a suitable current sensor 91 in the motor system, and applied to the input line 84 of the comparator 80. Although any suitable current sensing scheme may be employed, a suitable example of a system for producing a signal proportional to actual motor current is described in the aforesaid U.S. Pat. application, Ser. No. 711,109 . Comparator 80 produces an output signal on line 76 that is proportional to the difference between desired motor current and actual motor current. The comparator output signal on line 76 is thus indicative of the amount and direction of error between desired and actual motor current. The signals on line 76 are applied to the control circuits of the adjustable delay 70 to adjust the delay and therefore the phase relations between pulses $Pn$ and $Pf$ in accordance with the direction and magnitude of the error to provide the necessary increase or reduction of the motor current as the error dictates.

Pulse shapers 58 and 64 are employed to suitably shape the pulses for use as firing pulses for the thyristors of the chopper 20. The pulse shapers may for example be differentiators.

In order to make sure that the chopper 20 is turned off before switching the motor circuit from the motoring mode to the braking mode, or vice versa, and that the chopper 20 is maintained OFF until the motor circuit is set up in either braking or motoring mode as the case may be, the gate 68 is closed at appropriate times to suppress or block the ON pulses that would otherwise be applied to the chopper ON input 50.

The status of gate 68 is controlled by switching circuitry including switch contacts A8, A9, or relay A, switch contacts B1 and B2 of a relay B, and switch contacts C1 and C2 of a relay C. Relay B, which is energized by closing a switch S, also includes contacts B3 and B4. When relay B is deenergized, (condition shown), contacts B1 are closes, while contacts B2, B3 and B4 are open. The reverse obtains when relay B is energized. When the braking mode is desired, switch S is operated to the open position shown in the drawing. On the other hand, when the traction (motoring) mode is desired, switch S is operated to the closed position, thus to energize relay B. Switch S may be operated by an automatic vehicle control system or it may be operated manually. Contacts C1 and C2 of relay C are open when this relay is deenergized (position Shown).

Gate 68 is opened whenever an enabling signal from a voltage source 92 is applied to the control input line 78 of the gate. This occurs whenever a circuit path is completed between the signal source 92 and the gate terminal 78. It will be noted that there are two possible paths between the signal source 92 and the control terminal 78 of gate 68. One path is through contacts A8 and B1 when these contacts are closed. The other path is through contacts C1, B2 and A9 when these contacts are closed.

As seen in the drawing, relay A is energized when contacts B4 are closed, and relay C is energized when both sets of contacts A7 and B3 are closed. Thus relay A is energized in response to but after relay B is energized, and relay C is energized in response to but after relay A is energized.

Relay A is arranged so that contacts A1, A2 and A3 close before contacts A9 close, that is closure of contacts A9 is delayed with respect to closure of contacts A1, A2 and A3. Likewise closure of contacts C1 is delayed with respect to closure of contacts C2. Structure and techniques for delaying one set of relay contacts relative to another set on the same relay are well known and need no elaboration here.

Contacts C2, when closed, apply power from a trolley 94 and trolley line 96 to the motor circuit when set up in the motoring mode of contacts A1, A2 and A3. Relay C is a safety relay in that it is equipped with a series overcurrent trip system OL for opening the C contacts in case of overload on line 30. The trip system includes an overcurrent-responsive electromagnetic actuator 98 coupled to a latchable linkage 100 for driving contacts C2 and C1 open when an overload occurs in line 30. Linkage 100 also opens contacts OL1 to open the energizing line to relay C and contacts OL2 to open the output line of source 92 in response to the overload. Linkage 100 has a releasable latch 102 for latching the linkage in overcurrent position when an overload occurs. The latch 102 may be released manually or automatically to reset the trip system to normal (position shown) after overload is cleared. Relays equipped with series overcurrent trip mechanisms are well known and have been used for many years in traction systems. Suitable examples of such a relay are UPB-103 and UPB-203 types made and sold by Westinghouse Electric Corporation and described in its I.B. 20901.

OPERATION OF THE SYSTEM

The system is shown with the switch S open and relays A, B and C and overload actuator 98 unenergized. Thus the system is shown in the braking mode. Contacts A8 and B1 being closed, gate 68 is open. The average resistance and consequently the average motor current in the motor circuit is dependent on the ON-OFF ratio of the chopper 20 which in turn is dependent on the particular setting of the adjustable reference 86 representing a command or desired braking effort. The negative feedback of actual current information to the comparator input 84 produces corrective signals on line 76 which control the ON-OFF time ratio of the chopper 20 in a manner to reduce the error between command (desired) motor current and actual motor current thus to regulate the motor current to a constant value. Desired motor current and actual motor current correspond to commanded braking effort and actual braking effort, respectively, When it is desired, either under automatic control or human control, to shift the vehicle from the braking mode to the traction mode, switch S is operated to the closed position, thereby energizing relay B to open contacts B1 and close contacts B2, B3 and B4 after the opening of contacts B1. Opening of contacts B1, opens the gate 68 thus to disable the ON control channel 58, thereby preventing the chopper 20 from turning on.

In response to the closing of contacts B4, relay A is energized to close contacts A1, A2, A3, A7 and A9, and to open contacts A4, A5, A6 and A8. Contacts A4, A5, A6 and A8 open before contacts A1, A2, A3, A7 and A9 close. Opening of contacts A4, A5, and A6 opens up the braking configuration, and the closing of contacts A1, A2 and A3 connect the motor system into the motoring or traction configuration. It should be noted that the chopper 20 is still disabled, because the circuit from the voltage source 92 to the control terminal 78 of the gate 68 is still open.

Closure of contacts A7 completes an energizing circuit (contacts B3 closed) to relay C, thus energizing this relay to close contacts C1 and C2. Contacts C1 are arranged to have a delayed closing relative to contacts C2, that is, contacts C1 close after contacts C2 are closed. Closure of contacts C2 applies power from the trolley line 96 to the power input line 30 of the motor system. Closure of contacts C1 completes a circuit through closed contacts B2 and A9 from the signal source 92 to the control input terminal 78 of the gate 68 thereby opening the gate 68 and enabling the ON control channel 58. As a result, the ON signal pulse $Pn$ are applied to the ON input terminal 48 of chopper 20 thus activating the chopper in accordance with the phase relations between the ON pulses $Pn$ and the OFF pulses $Pf$ as dictated by the command signals from the reference source 86.

When it is desired to shift from the motoring or traction mode to the braking or deceleration mode, switch S is operated to its open position as shown in the drawing. As a result relay B is dropped out thereby opening contacts B2, B3 and B4 and closing contacts B1. The arrangement is such that contacts B1 close after the other B contacts are opened. Opening of contacts B2 block the gating signal to the gage control input terminal 78 thereby closing gate 68 and disabling the ON signal channel 58. This disables the chopper 20. Opening of contacts B4 and B3 causes relays A and C to drop out. Dropout of relay A switches the motor circuit from the motoring configuration to the braking configuration. Dropout of relay A also closes delayed action contacts A8 after the closure of contacts A4, A5 and A6. Closure of contacts A8 applies a gating signal from source 92 to gate input terminal 78 through closed contacts B1 thereby opening gate 68 and enabling the ON signal channel 58 thus activating chopper 20 in accordance with the desired braking effort dictated by the selected reference signal from the reference source 86.

From the preceding description of operation, it is seen that ON signals to the chopper are suppressed to deactivate the chopper and turn off the load current before switching from motoring (traction) mode to braking mode or from braking mode to traction mode, and that the main power circuits for traction or braking are first set up before turning the chopper on again.

If desired the intervening safety relay C and associated overcurrent protective system OL may be omitted and the same general operation be provided by bridging the circuit across contacts C1, and by making contacts C2 a part of relay A so as to close when that relay is energized. In such an embodiment, the contacts A9 should be arranged for delayed closure relative to the closure of contacts A1, A2, A3 and C2, to make sure that the chopper 20 is maintained OFF until the motor system is set up for motoring (traction) mode. Suitable overload protection may be arranged for this embodiment.

It should be understood that other suitable choppers may be employed, and that instead of the thyristors shown, other suitable switching elements may be used, for example, other kinds of solid state switching devices.

It should also be understood that the disclosed embodiment is employed by way of example only and is not intended to limit the invention to the specific example shown.

We claim:
1. In a control system for an electric motor coupled to a mechanical load;
   A. first current controller means operable to respective ON and OFF states when respective ON and OFF signals are received by the first current controller means;
   B. resistor means;
   C. respective first, second, third and fourth switch means each being operable to mutually exclusive ON and OFF states;
   D. means including said first switch means when in the ON state for connecting the motor and the current controller means in a motoring circuit arrangement wherein the first current controller means controls motoring current;
   E. means including said second switch means when in the ON state for connecting the motor, the resistor means and the first current controller means in a dynamic braking circuit arrangement wherein the current controller means controls braking current;
   F. an ON signal circuit which is rendered effective to provide ON signals to the first current controller means in response to an enabling signal;
   G. circuit means including the third switch means for supplying an enabling signal to said ON signal circuit when said third switch means is ON;
   H. circuit means including the fourth switch means for supplying an enabling signal to said ON signal circuit when said fourth switch means is ON;
   I. second controller means to which all said switch means are responsive, the second controller means being operable in first and second modes; and
   J. control means responsive to transition of the second controller means from mode to mode for
      a. in response to transition of the second controller means from its first mode to its second mode, operating the first and fourth switch means from ON to OFF and the second and third switch means from OFF to ON, in such order that the enabling signal is cut off before the first switch means opens, and is reapplied after the second switch means closes, and
      b. in response to transition of the second controller means from its second mode to its first mode, operating the first and fourth switch means from OFF to ON, and the second and third switch means from ON to OFF; in such order that the enabling signal is cut off before the second switch means opens, and is reapplied after the first switch means closes.

2. The combination of claim 1 wherein said first current controller means comprises a chopper.

3. The combination as in claim 1 wherein the ON signal circuit of (F) includes a gate which opens to pass ON signals in response to the enabling signal, and which is closed in the absence of the enabling signal.

4. The combination as in claim 1 wherein:
   1. said third switch means comprises fifth and sixth switch means, each operable to mutually exclusive ON and OFF states, and said third switch means is ON when said fifth and sixth switch means are both ON;
   2. said fourth switch means comprises seventh and eighth switch means, each operable to mutually exclusive ON and OFF states, and said fourth switch means is ON when said seventh and eighth switch means are both ON;
   3. the second controller means of (I) comprises first switch operating means mechanically coupled to the sixth and eighth switch means; and
   4. the control means of (J) comprises second switch operating means mechanically coupled to the first, second and fifth switch means, means for controlling the seventh switch means in response to the second switch operating means, and ninth switch means mechanically coupled to the first switch operating means for controlling the second switch operating means.

5. The combination as in claim 4 wherein said seventh switch means is mechanically coupled to said first switch operating means.

6. The combination as in claim 4 wherein the ON signal circuit of (F) includes a gate which opens to pass ON signals in response to the enabling signal, and which is closed in the absence of the enabling signal.

7. The combination as in claim 1 wherein said motor is a traction motor and said mechanical load comprises a driving axle of a vehicle.

8. The combination as in claim 1 wherein said motor is a traction motor and said mechanical load comprises a driving axle of a vehicle.

9. The combination as in claim 3 wherein said motor is a traction motor and said mechanical load comprises a driving axle of a vehicle.

10. The combination as in claim 5 wherein said motor is a traction motor and said mechanical load comprises a driving axle of a vehicle.

11. The combination as in claim 4 wherein said motor is a traction motor and said mechanical load comprises a driving axle of a vehicle.

12. The combination as in claim 4 wherein said first current controller means comprises a chopper.

13. The combination as in claim 12 wherein said motor is a traction motor and said mechanical load comprises a driving axle of a vehicle.

* * * * *